United States Patent Office 3,559,034
Patented Jan. 26, 1971

3,559,034
INVERTED CONVERTER HAVING COMMON QUENCHING MEANS FOR ALL CONTROLLABLE RECTIFIERS
Arne Jensen and Tom Kastrup Petersen, Nordborg, Denmark, assignors to Danfoss A/S, Nordborg, Denmark, a company of Denmark
Filed Feb. 14, 1969, Ser. No. 799,158
Claims priority, application Germany, Feb. 15, 1968, P 16 13 774.9
Int. Cl. H02m 7/52
U.S. Cl. 321—5                    3 Claims

ABSTRACT OF THE DISCLOSURE

The invention relates to an inverted converter of the type having at least two branches with each branch containing two controllable rectifiers arranged in series. Each controllable rectifier has a free running diode associated therewith and each branch is connected to a D.C. voltage supply through a short circuit impedance. The converter has common quenching control means in parallel with the branches. The quenching control means includes a condenser which is dischargeable through a controllable quenching rectifier and a choke.

---

Figure 1:
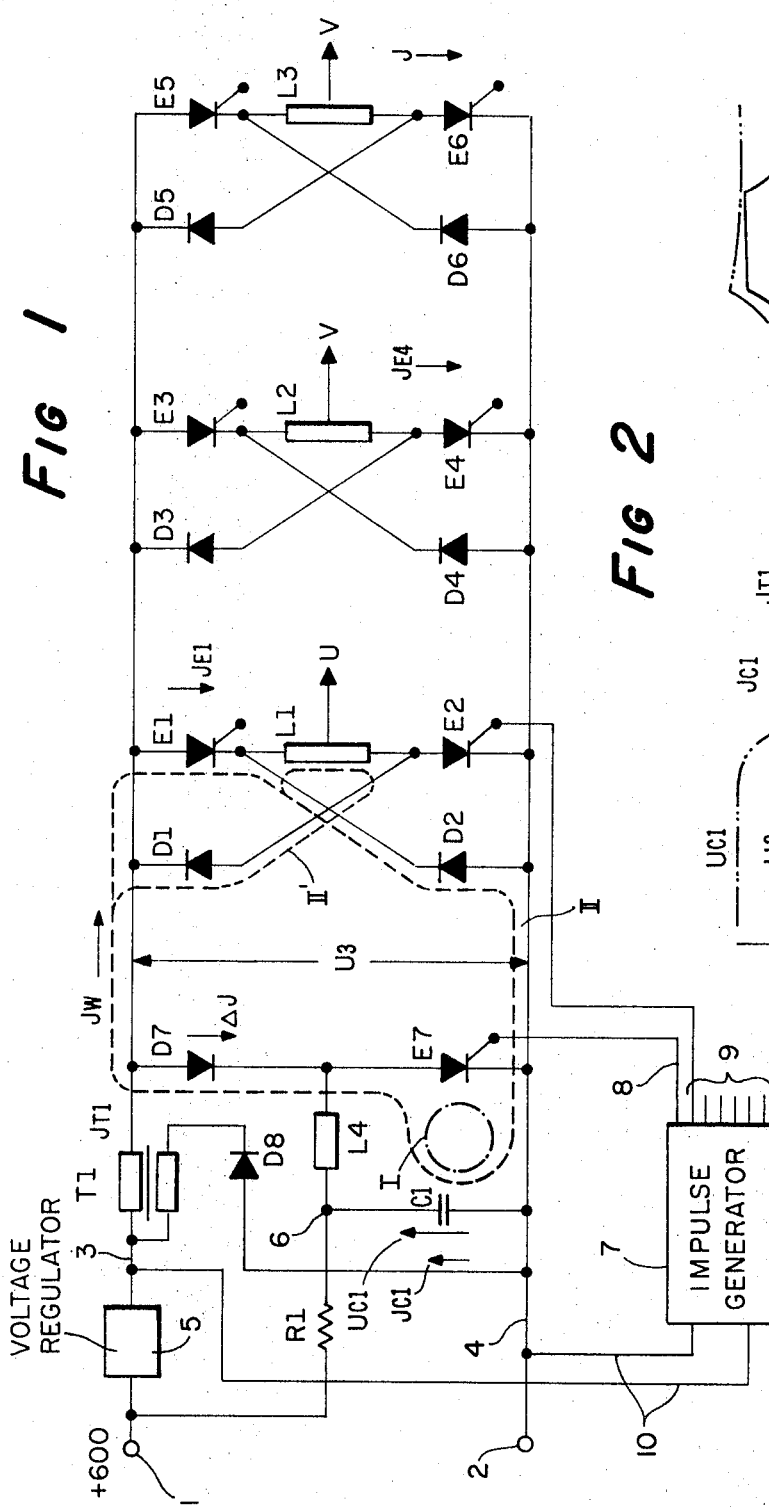

The invention relates to an inverted converter, in which at least two branches, each containing two controllable rectifiers arranged in series and associated each with a free-running diode, are connected to a direct-current voltage supply by way of a short-circuit impedance, and a common quenching control means, containing a condenser discharging through a controllable quenching rectifier and a choke, is connected in parallel with the branches.

An inverted converter of this kind having common quenching means for all controllable rectifiers contains a smaller number of components than an inverted converter having separate quenching circuits for each individual controllable rectifier, or for the rectifiers of each branch, or for the rectifiers of each polarity. In the case of common quenching, however, it is necessary for those rectifiers which should not yet have been quenched to be immediately struck again.

An inverted converter having common quenching means is known wherein a condenser is charged by a secondary D.C. voltage source through a first controllable quenching rectifier and, at the moment when quenching takes place, is connected in parallel through a second controllable quenching rectifier with the branches of the inverted converter having reverse polarity. This reverses the voltage for a brief period at the input of the inverted converter, so that the flow of current through the struck rectifiers is interrupted and these are quenched. Here, however, the quenching current should not flow past the controllable rectifiers through the free-running diodes. The free-running diodes must therefore be connected, by way of resistors, to a point in front of the short-circuit impedance. On account of the necessary symmetry, the short-circuit impedance must also be divided into two similar parts each associated with a supply conductor. Overall, this results in the use of a considerable number of components.

The object of the invention is to provide a quenching circuit for an inverted converter of the above-mentioned kind, in which common quenching can be achieved with a minimum of components and which enables the operating voltage of the inverted converter to be regulated in an asymmetrical manner. Furthermore, it is intended to be possible to keep the quenching current independent of the operating voltage of the inverted converter at the moment and of the associated load currents.

According to the invention, this object is achieved by the quenching circuit containing a series connection comprising a diode and the controllable quenching rectifier, the latter being bridged by a series connection comprising a recharging choke and a commutating condenser, and by connecting, in each branch, the cathode of the first free-running diode to the anode of the first controllable rectifier and the anode of the first free-running diode to the anode of the second controllable rectifier, as well as the cathode of the second free-running diode to the cathode of the first controllable rectifier and the anode of the second free-running diode to the anode of the second controllable rectifier.

When the quenching rectifier is struck by a control impulse, short-circuiting occurs between the two supply conductors through this quenching rectifier and the diode in series therewith. Consequently, a heavier current flows through this series connection, whilst the output current of the inverted converter, flowing through the struck controllable rectifiers, decreases. At the same time, the condenser discharges through the recharging choke and the quenching rectifier in the sense of a damped, harmonic oscillation, which is opposed to the short-circuit current during the second half-cycle and thus automatically quenches the quenching rectifier. Utilizing the free-running diodes, the condenser curernt is then distributed over the struck controllable rectifiers, the current passing through which is brought to zero, so that these are likewise quenched. A symmetrical arrangement of the switching means is not necessary.

In order to have a predetermined condenser charge available for the quenching, irrespective of the particular operating voltage of the inverted converter, it is of advantage for the commutation condenser and the controllable quenching rectifier to be jointly connected to one of the D.C. voltage supply conductors and for the other side of the commutating condenser to be connected to a D.C. source of constant voltage, by way of a resistor. If the inverted converter is fed through a series-connected voltage regulator from a constant D.C. voltage source, which is at least equal to the maximum operating voltage of the inverted converter, it is of advantage to connect the resistor, at a point in front of the voltage regulator.

In this way and without using a further switch, recharging of the condenser is always provided for to an extent such that the oscillation required for quenching proceeds sufficiently rapidly and firmly. On the other hand however, no recharging takes place while the quenching rectifier is opened, since the commutation condenser and the oscillating choke constitute a parallel oscillation circuit of high impedance. Since the control system can be asymmetrically arranged, a constant high auxiliary voltage is available in front of the regulator.

It is also advantageous to provide a choke with a central tapping between the two controllable rectifiers of each branch and for one free-running diode to bridge the choke and one controllable rectifier, and the other free-running diode to bridge the choke and the other controllable rectifier. With this arrangement, an additional inverse voltage occurs at the coil of the choke, and this ensures greater reliability in the quenching of the controllable rectifiers, even when the components are not exactly the same kind. It is therefore possible, for example, to use the rectifiers of different manufacturers having different voltage drops, and this is of advantage for replacement purposes, for instance.

Figure 2:
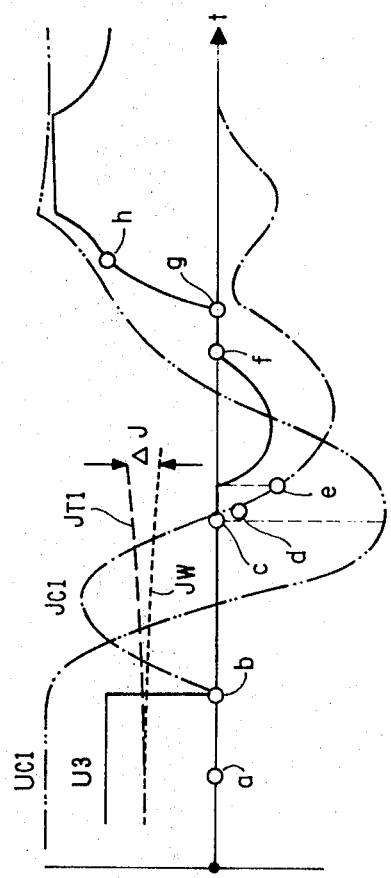

The invention will now be described in more detail by reference to an embodiment illustrated in the drawing, wherein:
FIG. 1 shows a connection diagram for an inverted converter in accordance with the invention, and FIG. 2 is a diagram in which current and voltage are plotted against time.

A D.C. voltage of 600 volts is fed to the terminals 1 and 2 associated with the supply conductors 3 and 4. A voltage regulator 5 and a short-circuit impedance in the form of a transformer T1 are contained in the supply line 3. Connected between the supply conductors 3 and 4 are three branches, which each consist of the series connection comprising two controllable rectifiers E1 and E2, E3 and E4, and E5 and E6, with chokes L1, L2 and L3 fitted between each pair. The three phases U, V and W of a three-phase supply are connected to a central tapping of these three chokes.

Associated with each branch are two free-running diodes D1 and D2, D3 and D4, and D5 and D6, which are of opposite polarity to the associated controllable rectifiers E1–E6. In the first branch, the cathode of the first free-running diode D1 is connected to the anode of the first controllable rectifier E1, and the anode of the first free-running diode D1 to the anode of the second controllable rectifier E2, whilst the cathode of the second free-running diode D2 is connected to the cathode of the first controllable rectifier E1 and the anode of the second free-running diode D2 to the cathode of the second controllable rectifier. In other words, the free-running diode D1 bridges the choke L1 and the controllable rectifier E1, and the free-running diode D2 bridges the choke L1 and the controllable rectifier E2. The other two branches are connected in precisely the same way.

The quenching circuit includes a series arrangement of a diode D7 and a controllable quenching rectifier E7, which lies between the supply conductors 3 and 4. The quenching rectifier E7 is bridged by a series arrangement comprising a commutating condenser C1 and a recharging choke L4. At the point of connection 6 between C1 and L4, there is connected a resistor R1, the other end of which is connected to the terminal 1, that is, to the source of constant D.C. voltage.

A control device 7 supplies control impulses for the quenching rectifier E7, through its output 8, and control impulses for quenching the controllable rectifiers E1–E8 through its outputs 9. The input conductors 10 show that the operating frequency of the inverted converter is controlled in dependence upon voltage, for example, in such manner that constant magnetization is always imparted to a connected polyphase induction motor. The control impulses at the output 8 occur six times during each cycle. Individual impulses of the required sequence, or series of impulses extending over the required striking period, can be sent through the outputs 9.

The secondary winding of the transformer T1 and the diode D8 serve the purpose of recovering the magnetic energy stored during commutation, by leading back into the filter system of the voltage regulator.

The progress of the quenching operation will now be described and the points of time designated by lower-case letters in the diagram of FIG. 2 will be considered one after the other. Here, the directions marked by arrows in FIG. 1 apply. It is assumed that just the rectifiers E1, E4 and E6 are struck.

(a) The condenser C1 is charged to 600 volts. The voltage $U_3$ at the branches of the inverted converter is fixed by the regulator 5. The currents $I_{T1}$ and $I_W$ are equal.

(b) The quenching rectifier E7 receives the control impulse and is struck. The voltage $U_3$ falls to zero. The current $I_{T1}$ rises and the current $I_W$ falls. The difference $\Delta I$ between these two currents flows through the diode D7 and the quenching rectifier E7. The condenser C1 begins to discharge in circuit I in the sense of an oscillation. This begins as current $I_{C1}$ rises and as voltage $U_{C1}$ falls.

(c) The condenser current $I_{C1}$ alters its sign and the condenser voltage $U_{C1}$ has reached its maximum negative value.

(d) The negative value of the condenser current $I_{C1}$ becomes greater than the current-difference $\Delta I$ passed through the diode D7. Consequently, the quenching rectifier E7 blocks. The current $I_{C1}$ now divides into three branches and flows through the circuit II, which is only indicated for the first branch. Here, only the diode voltage drops have to be overcome. The path through the controllable rectifiers is possible, since these were carrying the motor current beforehand. The current $\Delta I$ still flowing is received by the condenser C1.

(e) As soon as that part of the current $I_{C1}$ flowing through the rectifier E1 becomes oppositely equal to the current $I_W$, its current $I_{E1}$ passes through zero and the rectifier blocks. The same applies in the case of the rectifiers E4 and E6. The current $I_{C1}$ is then forced to take a path along the circuit II', i.e., instead of through the rectifier E1, through the choke L1 and the diode D1, and the same applies in the other branches. In this way, a negative voltage occurs in all the controllable rectifiers E1–E7, and this ensures that the quenching condition is established in all circumstances. The voltage $U_3$ here becomes negative. Also, the current forced by the connected motor now flows through the chokes and the free-running diodes.

(f) After the rectifiers E1, E4 and E6 have been quenched, a new combination of rectifiers can be struck. The condenser current $I_{C1}$ that is still flowing then again passes through the struck rectifiers, bypassing the chokes. Because of the small diode voltage drop, $U_3$ is here approximately zero.

(g) The current $I_{C1}$ moves towards zero. The voltage $U_3$ rises. The current $I_{C1}$ still flowing merely consists of the condenser recharging current passing through the diode D7 and the resistor R1 respectively.

(h) The quenching operation is completed. The voltage $U_3$ remains, for a short period, at a higher value than the initial value. The reason for this is that the secondary winding of T1 returns stored magnetic energy to the regulator, using the pass-through direction of the diode D8. The data of the control system then return to their normal values.

We claim:

1. An inverted converter comprising D.C. supply and return conductors, a short circuit impedance in series with said supply terminal, two branches in parallel between said conductors, each of said branches having first and second controllable rectifiers in series, each of said branches having first and second free running diodes respectively bridging said first and second controllable rectifiers, common quenching control means connected in parallel with said branches, said quenching control means including a series connection of a diode and a controllable quenching rectifier, said quenching rectifier being bridged by a series connection including a recharging choke and a commutating condenser, in each of said branches the cathode and anode of said first free-running diode are respectively connected to the anodes of said first and second controllable rectifiers, and in each of said branches the cathode and anode of said second free-running diode are respectively connected to the cathodes of said first and second controllable rectifiers, said commutating condsenser and said quenching rectifier being jointly connected to one of said conductors, the other side of said condenser being connected to said supply conductor, and a resistor being connected between said condenser and said supply conductor.

2. An inverted converter according to claim 1 including a D.C. voltage regulator in said supply conductor, said resistor being connected to said supply conductor on the upstream side thereof from said voltage regulator.

3. An inverted converter according to claim 1 wherein each of said branches has a choke with a central tapping between said first and second controllable rectifiers, said first free running diode in each of said branches bridging said first controllable rectifier and said choke, and said second free running diode in each of said branches bridging said second controllable rectifier and said choke.

References Cited

UNITED STATES PATENTS

| | | | |
|---|---|---|---|
| 3,321,697 | 5/1967 | Etter | 321—45 |
| 3,351,769 | 11/1967 | Davis | 321—45X |
| 3,388,310 | 6/1968 | Etter | 321—45CUX |
| 3,405,346 | 10/1968 | Krauthamer | 321—45 |
| 3,467,904 | 9/1969 | Studtmann et al. | 321—5X |

WILLIAM H. BEHA, JR., Primary Examiner

U.S. Cl. X.R.

321—45